(12) United States Patent
Ahmed et al.

(10) Patent No.: US 7,674,513 B2
(45) Date of Patent: Mar. 9, 2010

(54) CRACK-RESISTANT CERAMIC HONEYCOMB STRUCTURES

(75) Inventors: Izhar Zahoor Ahmed, Painted Post, NY (US); Weiguo Miao, Corning, NY (US)

(73) Assignee: Corning Incorporated, Corning, NY (US)

( * ) Notice: Subject to any disclaimer, the term of this patent is extended or adjusted under 35 U.S.C. 154(b) by 692 days.

(21) Appl. No.: 11/544,265

(22) Filed: Oct. 6, 2006

(65) Prior Publication Data

US 2007/0231534 A1    Oct. 4, 2007

Related U.S. Application Data

(60) Provisional application No. 60/787,782, filed on Mar. 31, 2006.

(51) Int. Cl.
*B32B 3/12* (2006.01)

(52) U.S. Cl. .................. 428/116; 428/117; 502/527.18

(58) Field of Classification Search .................. 428/116, 428/117, 119, 13, 188, 913, 327, 73, 307.3, 428/34.4, 177, 304.4, 192; 501/118, 119, 501/120, 153, 154; 502/527, 180, 178, 527.16, 502/527.17, 527.18; 55/523, 483, 502, 529

See application file for complete search history.

(56) References Cited

U.S. PATENT DOCUMENTS

| | | | | |
|---|---|---|---|---|
| 4,233,351 A | * | 11/1980 | Okumura et al. | 502/439 |
| 4,335,023 A | * | 6/1982 | Dettling et al. | 502/262 |
| 5,952,079 A | | 9/1999 | Andou et al. | 428/116 |
| 6,159,431 A | | 12/2000 | Inoue et al. | 422/180 |
| 2002/0192426 A1 | | 12/2002 | Ichikawa et al. | 428/116 |
| 2005/0274097 A1 | | 12/2005 | Beall et al. | 55/523 |

FOREIGN PATENT DOCUMENTS

| | | |
|---|---|---|
| EP | 0854123 | 7/1998 |
| EP | 1493479 | 1/2005 |

* cited by examiner

*Primary Examiner*—Timothy M Speer
*Assistant Examiner*—Gordon R Baldwin
(74) *Attorney, Agent, or Firm*—Matthew B. McNutt

(57) ABSTRACT

A ceramic honeycomb structure includes a honeycomb body having an array of interconnecting webs bounded by a skin. The interconnecting webs define an array of longitudinal cells having diagonal corners. Fillets are formed only in diagonally opposed corners traversed by lines perpendicular and/or substantially perpendicular to the skin.

11 Claims, 4 Drawing Sheets

CRACK-RESISTANT CERAMIC HONEYCOMB STRUCTURES

This application claims the benefit of U.S. Provisional Application No. 60/787,782 filed Mar. 31, 2006, entitled "Crack-Resistant Ceramic Honeycomb Structures".

BACKGROUND OF THE INVENTION

The present invention relates generally to ceramic honeycomb structures, and in particular to honeycomb structures such as honeycomb flow-through catalyst substrates and wall-flow particulate filters.

Soot particles are removed from diesel exhaust typically using a wall-flow honeycomb filter. FIG. 1 shows a prior-art ceramic honeycomb structure in the form of a wall flow filter 100. An array of parallel, straight cells 104 adapted for fluid flow runs axially along the length of the honeycomb filter 100. The cross-section of the cells 104 is typically square. The cells 104 are defined by an array of interconnecting porous webs 106 running along the length of the honeycomb filter 100 and intersecting with the skin 105 of the honeycomb filter 100. The cells 104 are end-plugged with filler material 107 in a checkerboard pattern at the end faces 108, 110 of the honeycomb filter 100. Diesel exhaust 112 enters the honeycomb filter 100 through the unplugged ends of the cells 104 at the end face 108, flows from one cell 104 to another through the porous webs 106, and emerges through the unplugged ends of the cells 104 at the end face 110, with the porous webs 106 retaining a portion of the soot particles. The efficiency of the honeycomb filter 100 is directly proportional to the amount of soot particles retained by the porous webs 106 with each pass of the exhaust.

As the soot particles accumulate on the porous webs, the effective flow area of the honeycomb filter decreases. This decreased effective flow area creates a pressure drop across the honeycomb filter, which leads to a gradual rise in back pressure against the diesel engine. When the pressure drop becomes unacceptable, thermal regeneration is used to remove the soot particles trapped in the honeycomb filter. During thermal regeneration, excessive temperature spikes can occur, producing thermal stress in the honeycomb filter 100. If the thermal stress exceeds the mechanical strength of the honeycomb filter 100, the honeycomb filter 100 can crack. This is particularly a concern where the honeycomb filter 100 is made of a low tensile strength material, such as ceramic.

Ceramic honeycomb flow-through catalyst substrates have the general honeycomb structure of filter 100, but do not incorporate end plugs of filler material 107 in the channels of the honeycombs. Thus they operate to treat engine exhaust gases as the exhaust flows directly through the channels of the substrates. While such flow-through substrates do not require regeneration to remove trapped particulates, they are nevertheless subjected to substantial stresses during catalytic reactor assembly and in the course of use. Further, advanced catalyst substrates typically incorporate porous webs 106 of very slight thickness, e.g. thicknesses in the 25-150 μm range, rendering them less mechanically durable than thicker-walled substrates.

Providing honeycomb substrates and filters with sufficient mechanical strength to withstand thermal shocks and filter regeneration without decreasing the performance of the honeycomb substrates and filters is challenging because mechanical strength and pressure drop tend to be inversely coupled. For example, for a honeycomb filter having a given effective flow area and pressure drop, the general approach to improving the mechanical strength of the honeycomb filter has been to thicken the porous webs. This modification has the advantage of increasing the thermal mass of the honeycomb filter but it creates a different problem in that web thickening reduces the effective flow area of the honeycomb filter. This reduction in the effective flow area of the honeycomb filter results in increase in pressure drop across the honeycomb filter, even before soot particles accumulate on the porous webs. To minimize the increase in pressure drop across the honeycomb filter, the porosity of the webs may be increased such that the effective flow area of the modified honeycomb filter is close to the given effective flow area. However, increasing the porosity of the webs is problematic in that it produces a corresponding decrease in the thermal mass of the honeycomb filter.

From the foregoing, there is an ongoing desire to improve the resistance of ceramic honeycombs such as honeycomb filters and catalyst substrates to cracking failure under mechanical loads and/or thermal regeneration that does not problematically increase pressure drop across the honeycomb structures in use.

SUMMARY OF THE INVENTION

In one aspect, the invention relates to a ceramic honeycomb structure that comprises a honeycomb body having an array of interconnecting webs bounded by a skin. The interconnecting webs define an array of longitudinal polygonal cells, some of which are selectively reinforced by the placement of corner reinforcement (termed "fillets") in the cell corners. In some embodiments, only selected corners of selected cells are filleted or otherwise reinforced. More particularly, fillets are included only in diagonal corners perpendicular and/or substantially perpendicular to the skin. By diagonal corners perpendicular and/or substantially perpendicular to the skin we mean those diagonally opposed cell corners intersected by cell diagonals having extensions that are perpendicular or substantially perpendicular to the skin.

In another aspect, the invention includes a honeycomb structure having a honeycomb body comprising an array of interconnecting webs bounded by a skin, the interconnecting webs defining an array of longitudinal cells of polygonal cross-section. The array of cells comprises both cells incorporating corner reinforcement and cells absent any corner reinforcement. Preferably, the cells incorporating corner reinforcement will include both reinforced corners and non-reinforced corners. The corner reinforcement provided in the reinforced cells is provided only in diagonally opposed cell corners intersected by cell diagonals that, when extended to their nearest points of intersection with the skin are perpendicular and/or substantially perpendicular to tangents to the skin of the structure at the intersection points.

In another aspect, the invention relates to an extrusion die for making a honeycomb filter comprising a die body, an array of discharge slots formed in the die body to define an array of first and second pins, the first pins having rounded diagonally opposed corners adjacent non-rounded corners, the second pins having non-rounded corners, and an array of feedholes in the die body for communicating an extrusion material to the discharge slots.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not intended to present true proportion or scale; certain features and certain views of the figures may be shown exaggerated in scale or in schematic in the interest of clarity and conciseness.

DETAILED DESCRIPTION OF THE INVENTION

Figure 1:
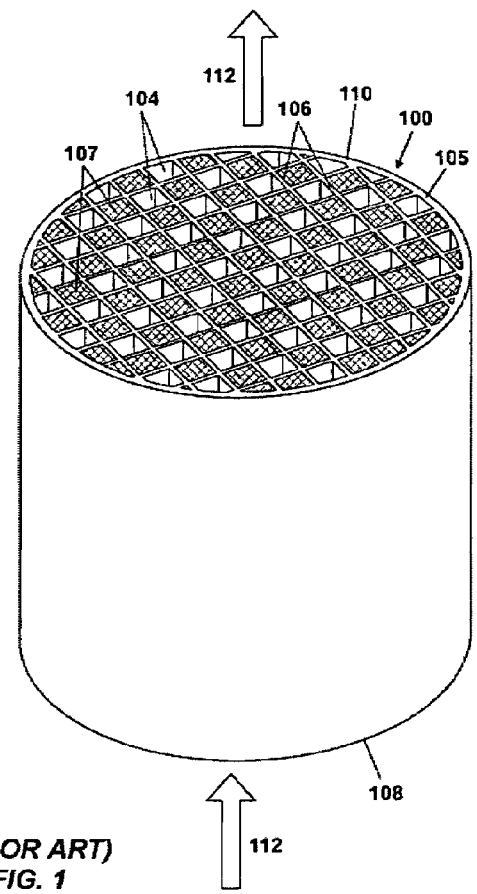
FIG. 1 is a perspective view of a prior-art wall-flow honeycomb filter.

The invention will now be described in detail with reference to a few preferred embodiments, as illustrated in the accompanying drawings. The descriptions are presented mainly with respect to diesel particulate filter embodiments even though the invention extends to other honeycomb structures such as ceramic flow-through catalyst substrates. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

The invention provides strategic filleting of cell corners in a honeycomb filter to increase the mechanical strength of the honeycomb filter without substantially increasing the pressure drop across the honeycomb filter. This strategic filleting is such that the effective flow area of the honeycomb filter is not substantially changed, thereby enhancing the mechanical strength of the honeycomb filter while maintaining a low pressure drop across the honeycomb filter.

A theoretical analysis of the honeycomb filter under thermal regeneration conditions was performed to determine those locations of highest stress concentration within the honeycomb structure, thus to determine where structural reinforcement might be placed to enhance mechanical strength. The results of the analysis indicated that maximum stress occurs at the diagonally opposed corners of cells on cell diagonals that are perpendicular or nearly perpendicular to the skin. These are cell corners intersected by diagonals through the cells that, if extended to the skin, would intersect the skin at right angles to tangents to the skin at their points of intersection therewith.

To reduce cracking, fillets are formed only at those corners on cell diagonals that are perpendicular to the skin, and not at adjacent corners within the filleted cells. Fillets may also be formed in diagonal corners that are substantially perpendicular to the skin. By adding fillets to these high stress areas only, the crack resistance of the honeycomb filter can be increased without substantially increasing the pressure drop across the honeycomb filter.

Figure 2A:
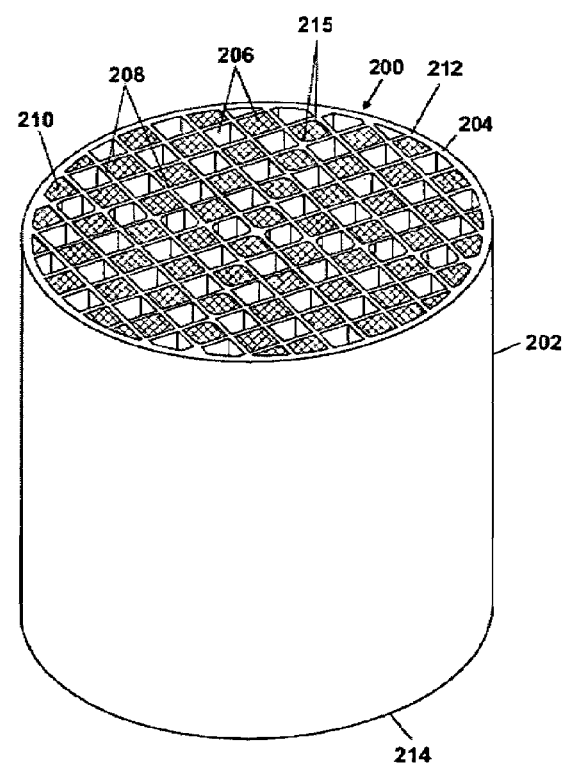
FIG. 2A is a perspective view of a ceramic honeycomb structure having longitudinal cells defined by interconnecting webs and bounded by a skin, with fillets formed in only in cell diagonal corners perpendicular to the skin.

FIG. 2A shows a ceramic honeycomb structure 200 having improved structural strength, crack-resistance and low pressure drop. The ceramic honeycomb structure 200 includes a columnar, honeycomb body 202. The honeycomb body 202 is typically formed of an extruded fired ceramic, although other materials may also be used. The ceramic may be cordierite, for example. The honeycomb body 202 has a skin 204, that in FIG. 2A is of circular profile. In other examples, the skin 204 may have an elliptical profile, an oval profile, a so-called racetrack profile, or any other closed cylindrical profile.

An array of longitudinal cells 206 is formed in the honeycomb body 202. The transverse cross-section of the cells 206 can have any desired shape, but in most embodiments the shape is square or rectangular, comprising four sides and four corners. The cells 206 are defined by an array of interconnecting porous webs 208 running along the length of the honeycomb body 202 and intersecting with the skin 204 of the honeycomb body 202. The cells 206 are end-plugged with filler material 210 in a checkerboard pattern at the end faces 212, 214 of the honeycomb body 202. Selected corners of selected cells 206 in body 202 include fillets 215 in the corners of those selected cells to improve structural strength and crack resistance without unduly increasing pressure drop.

Figure 2B:
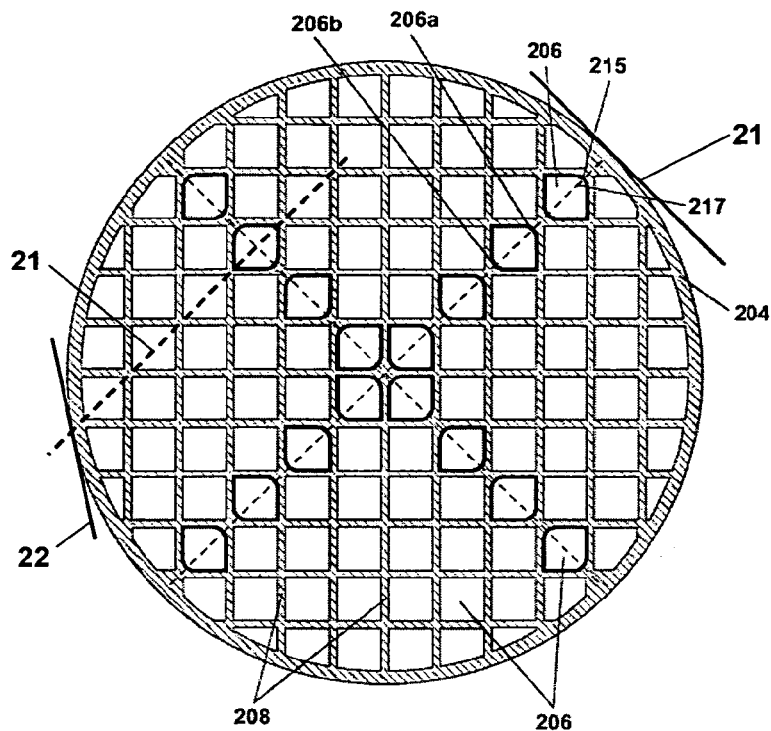
FIG. 2B is a transverse cross-section of the ceramic honeycomb structure of FIG. 2A.

FIG. 2B shows a transverse cross-section of the ceramic honeycomb structure 200. The cells 206 that include fillets 215 according to the invention are shown with thicker lines than the cells 206 that do not include fillets 215. Fillet shape is not a critical-aspect of the invention; any corner thickening that has the effect of corner reinforcement can be employed. Thus, for example, the fillets 215 may be concave, as shown in FIG. 2B, or of convex or planar strut or brace design. The fillets 215 in FIG. 2B are formed in diagonal corners 206a, 206b perpendicular to the skin 204. That is, those corners and similarly aligned corners fall on diagonals through the cells, as indicated by phantom diagonal line 217, that are perpendicular to the skin if extended thereto (line 217 being at right angles to skin tangent line 218 at the 217-218 intersection point). On the other hand, those cell corners falling on cell diagonals indicated by phantom diagonal line 219 are not filleted, since the diagonals are not perpendicular or substantially perpendicular to the skin (i.e., line 219 does not intersect the skin perpendicularly to skin tangent line 220 at the 219-220 intersection point).

Figure 2C:
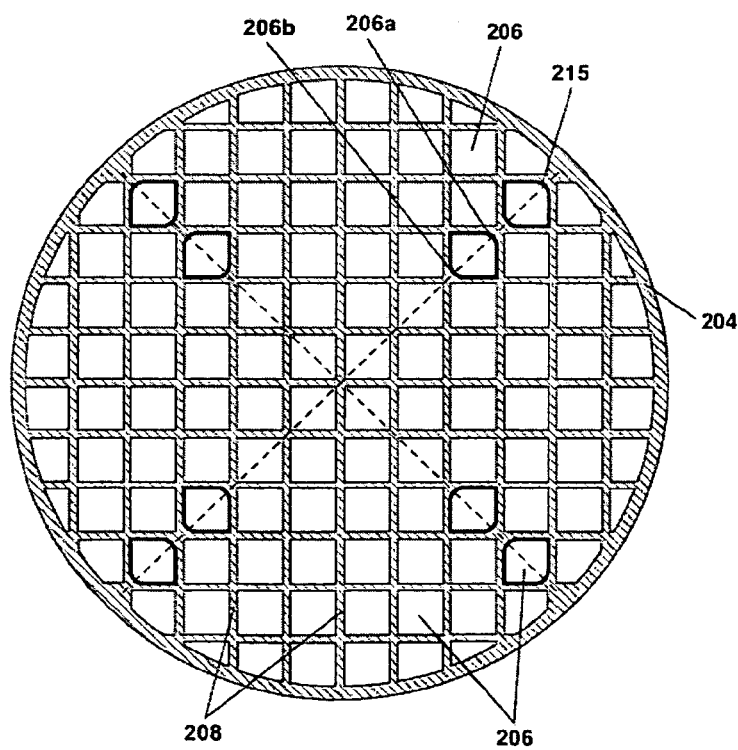
FIG. 2C is a variation of FIG. 2B, with fillets formed in cell diagonal corners perpendicular to and near the skin only.

For circular skin 204, the diagonal corners 206a, 206b perpendicular to the skin 204 coincide with those divided by radii to the skin 204, again as represented by phantom lines 217. In FIG. 2B, all the diagonal corners 206a, 206b perpendicular to the skin 204 include the fillets 215. In another example, as illustrated in FIG. 2C, only the diagonal corners 206a, 206b falling on cell diagonals perpendicular to the skin 204 for cells in a region near the skin 204 include the fillets 215. For the purposes of the present invention, the region near the skin of a honeycomb structure comprises the outer one-third of the cross-section of the structure as measured from the center or centroid of a honeycomb cross-section taken perpendicularly to the axis of orientation of the cells of the structure.

Figure 2D:
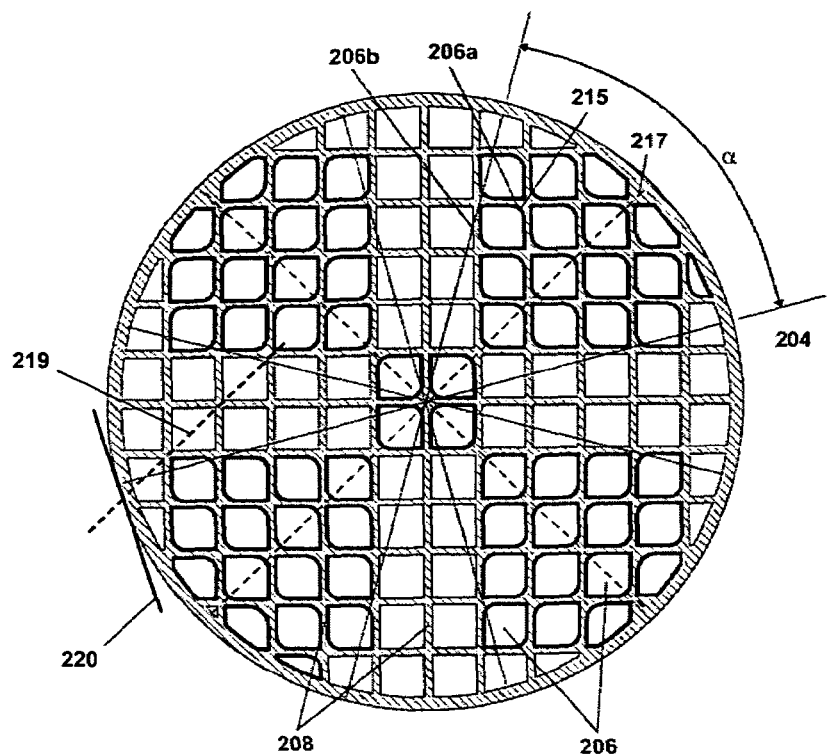
FIG. 2D is a variation of FIG. 2B, with fillets in cell diagonal corners substantially perpendicular to the skin.

In another example, as illustrated in FIG. 2D, the diagonal corners 206a, 206b traversed by cell diagonals either perpendicular or substantially perpendicular to the skin 204 will include fillets 215. The diagonal corners 206a, 206b on cell diagonals substantially perpendicular to the skin 204 are located in a sector of the structure within an included angle α that encompasses the group of cell diagonals indicated by phantom diagonal line 217 that are exactly perpendicular to the skin 204. The included angle α may range from 30 degrees (e.g., ±15 degrees from the 45-degree diagonal line 217 through a circular structure such as shown in FIG. 2D) to as much as 60 degrees (e.g., ±30 degrees from that diagonal). As in the example illustrated in FIG. 2C, the fillets 215 within this sector may also be limited to a region near the skin. For the purposes of the present description a cell diagonal is substantially perpendicular to the skin if it falls within an included angle α that is within ±30 degrees of exactly perpendicular to the skin.

Figure 2E:
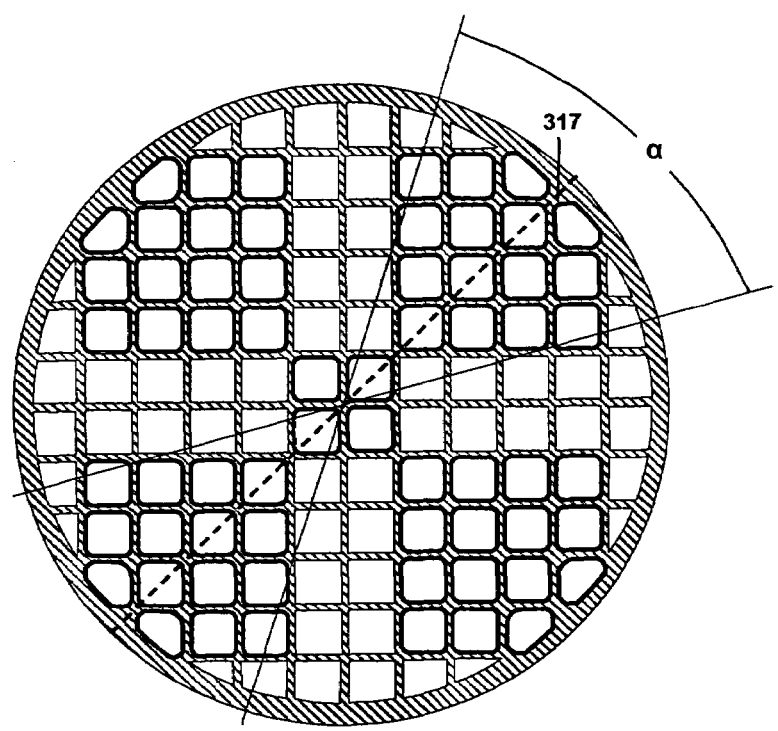
FIG. 2E is a variation of FIG. 2D with filleting provided on all corners.

In yet another example, illustrated in FIG. 2E of the drawings, filleting is provided on all cell corners within the included angles α about 45-degree diagonal 317. Fillet in all cell corners as shown in FIG. 2E slightly increases pressure drops for gases flowing through the structure, but the increases are less than encountered in structures wherein all corners of all cells are reinforced.

The most effective sectors for reinforcement in honeycomb structures of more general closed cylindrical cross-section (circular as well as non-circular shapes) can be more generally determined with reference to the angles that the cell diagonals on each of several projected diagonal lines through the structure make with tangents to the skin at their projection/skin tangent intersection points. Thus, in FIG. 2D, cell corners traversed by cell diagonals aligned with phantom cell diagonal projection line 219 are not filleted, since those cell diagonals are not perpendicular or nearly perpendicular to skin tangent line 220 at the intersection of tangent 220 and projection 219. Most effectively, the filleted corners are only those traversed by cell diagonals within ±30° of perpendicular to the skin (skin tangent line), or more preferably within ±15° of perpendicular to the skin.

Returning to FIG. 2A, for applications such as diesel exhaust particulate filtration, the honeycomb filter 200 may have a cellular density between 10 and 300 cells/in2 (about 1.5 to 46.5 cells/cm2), more typically between 100 and 200 cells/in2 (about 15.5 to 31 cells/cm2). The thickness of the porous webs 208 may be in a range from 0.002 in. (about 0.05 mm) to 0.060 in. (1.5 mm), preferably from 0.010 to 0.030 in (about 0.25 to 0.76 mm). The porosity of the porous webs 208 may be between 40 and 60% by volume. The porous webs 208 may incorporate pores having mean diameters in the range of 1 to 60 μm, more preferably in a range from 10 to 50 μm. Each fillet or brace (215 in FIGS. 2A-2C) should have a cross-section such that it occupies not more than about 12% and not less than about 2% of the cross-sectional area of the cell in which it is provided.

Figure 3:
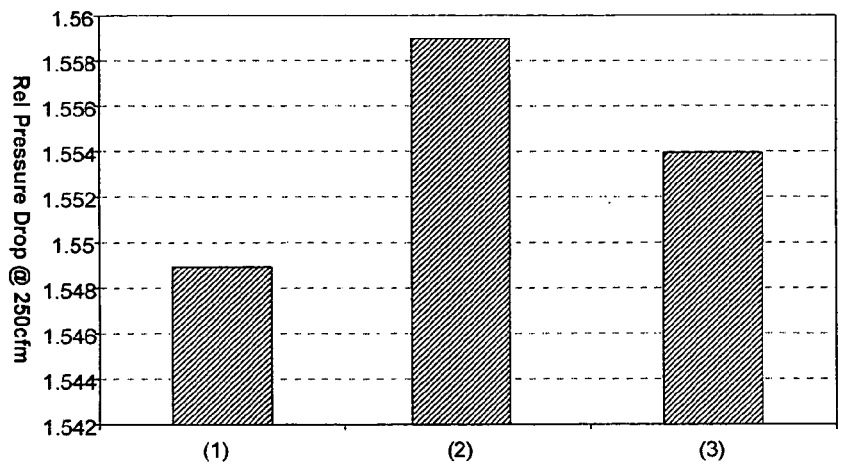
FIG. 3 is a comparison of pressure drop in ceramic honeycomb structures of differing design, including structures with and without selective filleting.

The advantageous effect of limiting corner reinforcement to only selected regions of a honeycomb structure is illustrated in FIG. 3 of the drawings. FIG. 3 plots modeled relative pressure drops at a common set gas flow velocity across porous ceramic exhaust filters of various designs. Sample Filter (1) is a filter of conventional design as illustrated in FIG. 1 of the drawings, wherein no corner fillets or other corner reinforcements of any kind is provided in that filter. Thus the pressure drop reported for Sample Filter (1) is inherent in the filter structure itself.

Sample Filters (2) and (3), which are of the same size and shape as Sample Filter (1), illustrate the tendency of cell corner reinforcements such as fillets to increase the filter pressure drop for filters of modified FIG. 1 design. Sample Filter (2) exhibits modeled pressure drop performance at the same gas flow velocity as used to evaluate sample filter (1), but wherein all corners of all cells in a selected peripheral area of the filter are provided with reinforcing fillets. Sample Filter (3), on the other hand, represents the pressure drop performance for a filter of the same size and shape as Sample Filter (2), but wherein fillets are provided only in half of the cell corners in the same peripheral area of the filter, as would be the case when filleting only diagonally opposing corners of the filleted cells. The substantially reduced pressure drop penalty observed in filleted Sample Filter (3) as compared with filleted Sample Filter (2) is evident from these data.

Figure 4:
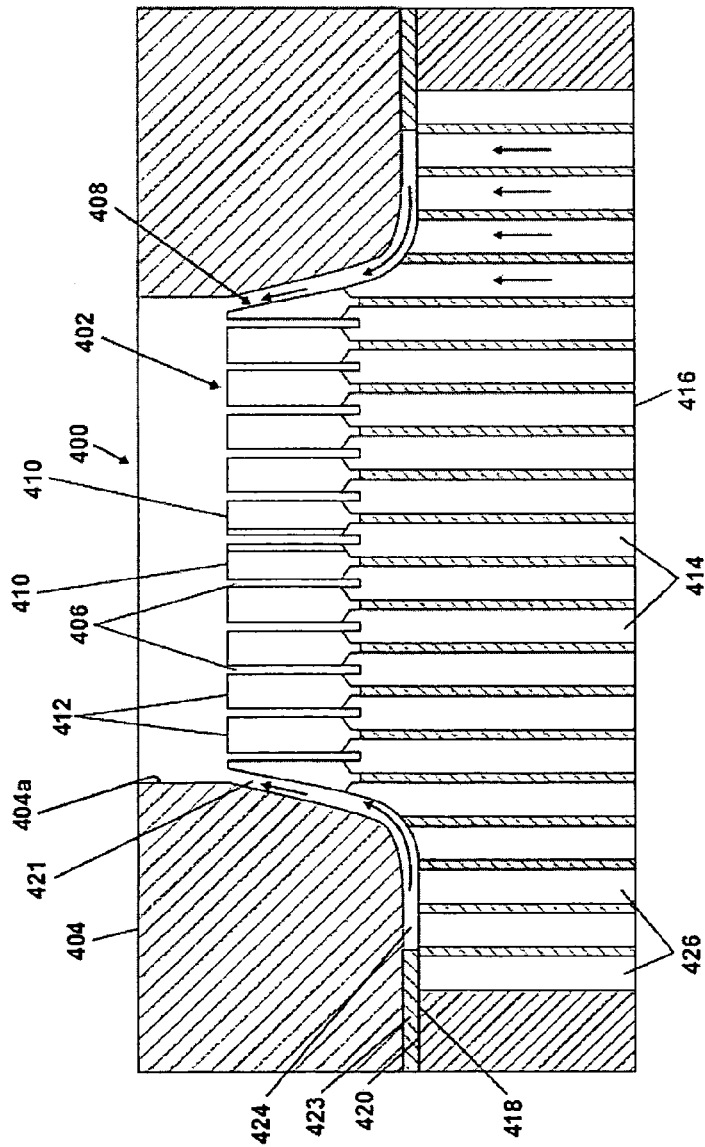
FIG. 4 is a vertical cross-section of an extrusion die assembly for making the ceramic honeycomb structure of FIGS. 2A-2D.

For illustration purposes, FIG. 4 shows a vertical cross-section of an extrusion die assembly 400 suitable for the manufacture of the honeycomb filter. The extrusion die assembly 400 includes an extrusion die 402 and a skin forming mask 404. The extrusion die 402 cooperates with the skin forming mask 404 to define the shape and thickness of the skin of the honeycomb filter. An array of discharge slots 406 is cut in a cell forming region 408 of the extrusion die 402 to define an array of first and second pins 410, 412. In one example, the transverse cross-section of the pins 410, 412 is generally square, with the diagonal corners of the first pins 410 rounded. The cell forming region includes an array of feedholes 414, which extend from the inlet face 416 of the extrusion die 402 to the array of discharge slots 406. The feedholes 414 supply batch material to the discharge slots 406. The skin forming region 418 of the extrusion die 402 includes a mounting surface 420 for the skin forming mask 404. The inner surface 404a of the skin forming mask 404 is spaced radially from the cell forming region 408 to define a skin forming slot 421. A shim 423 may be interposed between the mounting surface 420 and the skin forming mask 404 to define a skin forming reservoir 424 between the skin forming region and the skin forming mask 404. Feedholes 426 in the skin forming region supply batch material to the skin forming reservoir 424. In operation, the honeycomb body is formed by supplying batch material into the feedholes 414, 426 and extruding the batch material through the discharge slots 406 and the skin forming slot 421.

The extrusion die described above can be manufactured using existing methods for making extrusion dies. The cell forming region may be made by machining holes in a lower portion of a block that is made of a machinable material. These holes would serve as the feedholes. A process such as plunge electrical discharge machining (EDM) can be used to cut the discharge slots in the upper portion of the block. Pins remain on the upper portion of the block after the slots are cut. The pins at the periphery of the block can be shortened or completely removed to provide a mounting surface for the skin forming mask. The discharge slots and pins could have any of the cell/web configurations described in FIGS. 2B-2D. Alternatively, conventional extrusion dies can be modified to include rounded diagonal corners in a configuration suitable for making the filter described in FIGS. 2A-2D. Plunge EDM may be used to modify the extrusion die. The electrode need only encompass the areas of the die to be modified, i.e., the areas of the die that correspond to the cells having rounded diagonal corners according to the invention.

What is claimed is:

1. A honeycomb structure comprising:
a honeycomb body having an array of interconnecting webs bounded by a skin, the interconnecting webs defining an array of longitudinal cells of polygonal cross-section having corners,
the array of cells comprising both cells incorporating corner reinforcement and cells absent any corner reinforcement,
the cells incorporating corner reinforcement including diagonally opposed corner reinforcement and lying on cell diagonals that extend perpendicular and/or substantially perpendicular to the skin.

2. The honeycomb structure of claim 1 wherein the cells incorporating corner reinforcement include both reinforced corners and non-reinforced corners, with corner reinforcement being provided only in diagonally opposed corners intersected by cell diagonals that extend perpendicular and/or substantially perpendicular to the skin.

3. The honeycomb structure of claim 1 which is formed of a porous ceramic, and wherein the cells have a square cross-section and the corner reinforcement is a concave fillet or brace.

4. The honeycomb structure of claim 3, wherein the skin has a circular geometry.

5. The honeycomb structure of claim 4, wherein the reinforced corners intersected by cell diagonals substantially perpendicular to the skin are located within sectors of the structure disposed within a contained angle of from 10 to 60 degrees centered upon the cell diagonals perpendicular to the skin.

6. The honeycomb structure of claim 1, wherein the reinforced corners are located near the skin.

7. The honeycomb structure of claim 3, wherein the thickness of the webs is in a range from 0.025 mm to 0.76 mm.

8. The honeycomb structure of claim 7, wherein each fillet occupies from 2-12% of the cell cross-section.

9. The honeycomb structure of claim 3 having a cell density is in a range from 1.5 to 46.5 cells/cm2.

10. The honeycomb structure of claim 1 wherein the webs are porous.

11. A honeycomb structure comprising:
a honeycomb body having an array of interconnecting webs bounded by a skin, the interconnecting webs defining an array of longitudinal cells of polygonal cross-section having corners,
the array of cells comprising both cells incorporating corner reinforcement and cells absent any corner reinforcement,
the cells incorporating corner reinforcement including both reinforced corners and non-reinforced corners, the reinforced corners being those diagonally opposed cell corners intersected by cell diagonals that extend perpendicular or substantially perpendicular to tangents to the skin at nearest points of intersection with the skin.

* * * * *